United States Patent
Skade et al.

(10) Patent No.: US 6,457,556 B1
(45) Date of Patent: Oct. 1, 2002

(54) CATCHING DEVICE FOR A SYSTEM FOR PROTECTING PERSONS WORKING AT HEIGHTS

(75) Inventors: Toralf Skade, Dresden; Ronald Mickan, Coswig, both of (DE)

(73) Assignee: Soll GmbH, Hof (DE)

( * ) Notice: Subject to any disclaimer, the term of this patent is extended or adjusted under 35 U.S.C. 154(b) by 0 days.

(21) Appl. No.: 09/646,163

(22) PCT Filed: Mar. 29, 1999

(86) PCT No.: PCT/EP99/02137

§ 371 (c)(1),
(2), (4) Date: Sep. 12, 2000

(87) PCT Pub. No.: WO99/49939

PCT Pub. Date: Oct. 7, 1999

(30) Foreign Application Priority Data

Mar. 30, 1998 (DE) ........................... 298 05 788 U

(51) Int. Cl.[7] ................................................ A47L 3/04
(52) U.S. Cl. .............................. 182/8; 182/3; 182/18; 403/2; 188/371
(58) Field of Search ........................ 182/3, 4, 5, 6, 182/7, 8, 18; 403/2

(56) References Cited

U.S. PATENT DOCUMENTS

| | | | | |
|---|---|---|---|---|
| 1,010,763 | A | * 12/1911 | Hogan | 182/8 |
| 4,057,211 | A | * 11/1977 | Moore | 248/332 |
| 4,538,703 | A | * 9/1985 | Ellis et al. | 182/5 |
| 5,224,427 | A | 7/1993 | Riches et al. | |
| 5,336,013 | A | * 8/1994 | Duffy et al. | 403/2 |
| 5,360,082 | A | 11/1994 | Bell | |
| 5,400,868 | A | * 3/1995 | Ellis et al. | 182/18 |
| 5,458,214 | A | * 10/1995 | Olson et al. | 182/18 |
| 5,466,082 | A | * 11/1995 | Sherar | 403/2 |
| 5,492,204 | A | * 2/1996 | Wallace | 188/112 R |
| 5,497,537 | A | * 3/1996 | Robinson et al. | 24/716 |
| 5,598,900 | A | * 2/1997 | O'Rourke | 182/3 |
| 5,669,119 | A | * 9/1997 | Seron | 24/265 H |
| 5,960,480 | A | * 10/1999 | Neustater | 182/3 X |
| 6,113,055 | A | * 9/2000 | Salman | 248/548 |
| 6,161,647 | A | * 12/2000 | Braden et al. | 182/8 |
| 6,279,680 | B1 | * 8/2001 | Casebolt | 182/3 |

FOREIGN PATENT DOCUMENTS

| | | | | |
|---|---|---|---|---|
| DE | 2637593 | | 1/1978 | |
| DE | 295 01 716.3 | | 3/1995 | |
| FR | 2 555 060 | | 5/1985 | |
| GB | 2029488 | * | 3/1980 | 182/8 X |
| GB | 2177902 | * | 2/1987 | 182/8 X |
| HU | 181514 B | | 2/1979 | |
| HU | 178827 B | | 9/1981 | |
| WO | WO 95/29738 | | 11/1995 | |
| WO | WO 95/32759 | | 12/1995 | |

\* cited by examiner

*Primary Examiner*—Bruce A. Lev
(74) *Attorney, Agent, or Firm*—Hoffman & Baron, LLP

(57) ABSTRACT

A damping element for a catching carriage for damping the catching impact in the event of a fall of a user from a height includes a first end adapted to be connected to the carriage and a lug disposed at a second end adapted to be connected to a catching belt secured to the user. The damping element is releasably fixed in a non-rectilinear shape by at least one frangible link dimensioned for releasing the damping element from its non-rectilinear shape when a certain load is applied, so that it can damp the catching impact.

8 Claims, 2 Drawing Sheets

CATCHING DEVICE FOR A SYSTEM FOR PROTECTING PERSONS WORKING AT HEIGHTS

BACKGROUND OF THE INVENTION

1. Field of the Invention

The invention relates to a damping element for a catching device for preventing a person from falling from a ladder, a landing or similar, the person being secured by a catching belt on the catching device. The damping element is oblong and has a non-rectilinear shape. In the event of a fall, the damping element is deformed by the fall energy into a more linear shape, as a result of which the catching impact is damped.

2. Description of the Prior Art

Such catching devices can have a carriage which can be guided along the guide rail as well as a fastening device for securing the catching belt to the carriage, the fastening device containing the damping element which damps the catching impact in the event of a fall. Such a catching device is known where the fastening device has an S-shape for forming the damping element. Because of the loads and forces which are exerted on the damping element during the normal use of such a catching device, there is the danger that in the course of time the damping element deforms from its original S-shape into a more elongated shape so that the damping function is impaired.

From DE-A-34 26 551, a catching device for a climbing guard system is known where the fastening device is a somewhat reniform dented steel ring which is elongated in the event of a fall. The fall energy is reduced by the elongation and as a result the catching impact is damped.

From DE-A-26 37 593, a damping device for a safety harness is known which contains a section folded several times in a zigzag shape which likewise absorbs a part of the fall energy in the event of a fall and thus damps the catching impact.

OBJECTS AND SUMMARY OF THE INVENTION

A carriage or a runner with a damping element is furthermore known from DE-U-295 01 716. The damping element rests on a pin-shaped projection of a pawl and a crosspiece is housed on the pin-shaped projection between the damping element and the carriage. For this catching device, the damping path is limited or an enlargement of the damping path would inevitably lead to an unmanageable size of the catching device.

The object of the invention is to create a damping element for a catching device where a deformation or an impairment of the damping function by the forces and loads normally occurring during use is avoided.

According to the invention this object is achieved in that the damping element is fixed in its non-rectilinear shape, the fixing being so dimensioned that it releases the damping element when a certain load is applied, so that this can damp the catching impact.

The non-rectilinear shape of the damping element can mean that the damping element has a S or U-shape, is spiral or rolled up or is curved or is bent in some other way so that it can be brought out of this non-rectilinear shape into a linear or elongated shape only by application of force.

Fixing is preferably by means of links, welding points, rivets, bands or brackets, which are positioned so that there is as large as possible a distance between them and the bending or other curvature of the non-rectilinear shape effected by the S-fold.

The catching device according to the invention can be of the type known from DE-U-295 01 761 where a pawl is rotatably housed in the carriage which runs up against catching stops in the guide rail in the event of a fall and in which the catching belt is secured to the pawl. Instead of the pawl, an arrestor lever can also be provided which presses against the rail in the event of a fall and stops the carriage on the rail by friction.

For rails which run horizontally, pawls or arrestor levers are not used in general and the fastening device can consist of a lug or a connector articulated to the carriage.

The damping element preferably consists of a flat steel bar folded or rolled-up one or more times. The intensity of the catching impact can be limited by the dimensioning of the flat steel bar. In the event of a fall, a maximum of 6 kN should act on the person. To limit the catching impact to approx 4 kN, the flat steel bar has a cross-section of 8×10.5 mm—material steel 1.4301. The links for fixing the form of the damping element can have a cross-section of 0.5×8 mm.

While the links or welding points are form-fixing means, which are nonreleasably connected to the damping element, fixing means in the form of bands or brackets need not be nonreleasably connected to the damping element. These form-fixing means are closed in themselves, but need not be nonreleasably connected to the damping element.

In order to prevent a person from being injured by the remains of links in the event of a fall, the area immediately surrounding the links is recessed, the recess optionally being able to be surrounded by a raised edge. The areas of the damping element folded onto each other can therefore touch each other in the area of the links so that the remains of the links are very short and do not project beyond the contour of the damping element. Another possibility is to provide covering plates overlapping laterally at the links, which cover remains of links.

Embodiments of the invention are explained in the following using the drawing. It is shown in:

DETAILED DESCRIPTION OF THE INVENTION

Figure 1:
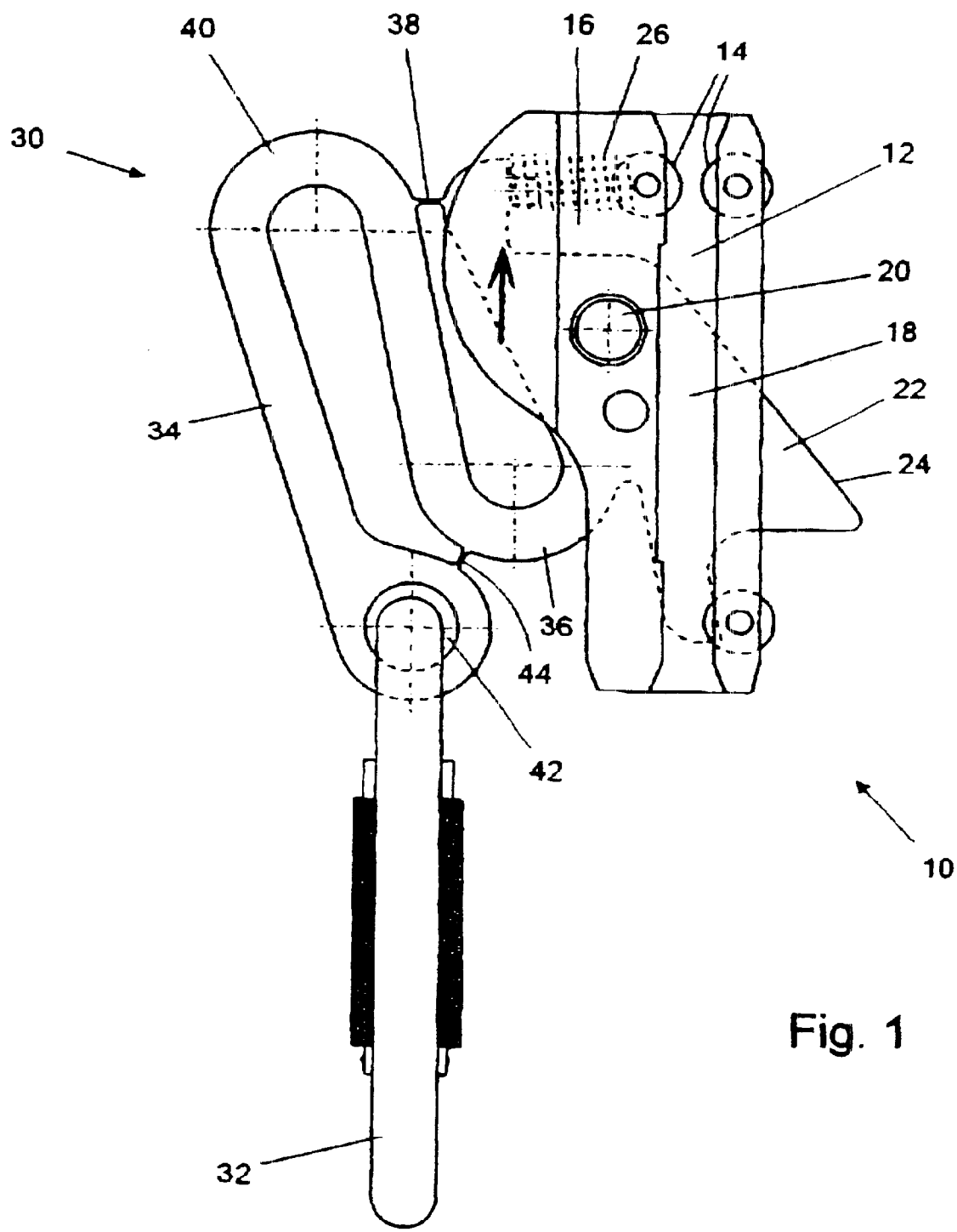
FIG. 1 a carriage of the catching device with S-shaped damping element from the side.

The catching device represented in FIG. 1 has a carriage 10 which is guided in a guide rail which is not shown. The guide rail has the C-profile known from EP-A-0 168 021, the opening edges of the C profile serving as guide flanges. The carriage 10 has guide grooves 12 on both sides which house the guide flanges of the guide rail. Guide rolls 14 which roll off on the outside and the inside of the guide flanges project into the guide grooves 12.

The carriage 10 has a slit-shaped opening 16 in which a pawl 18 is rotatably housed on a pin 20. The nose 22 of the pawl 18 projects from the carriage 10 so far into the inside of the C-profile of the guide rail that the nose 22 strikes against the catching stops protruding inwards from the rear of the rail or against the rungs passing through the C-profile.

The pin 20 is located in the upper area of the pawl 18 and the rear 24 of the nose 22 is inclined downwards away from the pin bearing.

The pawl 18 stands under the action of a compression spring 26 which presses against the pawl 18 above the pin bearing so that the nose 22 protrudes as far as possible out of the carriage 10. To this extent, the design and use of the carriage 10 corresponds to the carriage according to DE-U-295 01 716, to which reference is made as regards the details.

A snap hook 32 is fastened to the pawl 18 on the side facing the user and underneath the pin 20, with a damping element 30 interposed, from which a safety or rescue harness of the user is suspended.

The damping element 30 is formed by a flat steel bar 34 which is bent or folded in an S-shape and begins directly at the pawl 18 somewhat underneath the pin 20, is there bent upwards in a first bend 36 of approx. 180° and is connected at the upper end by means of a first link 38 to the upper end of the pawl 18. There the flat steel bar 34 is bent downwards in a second bend 40 of approx 180°, a lug 42 being arranged at the lower end from which the snap hook 32 hangs. The lug is connected to the outside of the first bend 36 by means of a.second link 44. The line connecting the lug 42 to the pin 20 forms an angle of approx. 30° to the vertical.

The two links 38 and 44 are so dimensioned that they resist the forces occurring during normal use and thereby fix the flat steel bar 34 in its S-shape and in the case of a fall they fracture when a certain value of the catching impact, generally 5 kN, is exceeded. They have for example a thickness of 0.5×8 mm. The flat steel bar 34 bent in an S-shape is then bent open by the weight of the person falling into the rescue harness and is stretched almost straight. A part of the fall energy is thereby converted into deformation energy and the catching impact is damped. The flat steel bar 34 is so dimensioned that a force of roughly 3 to 5 kN is necessary for its deformation. Because of the folding-out of the flat steel bar 34, a path of 10 cm is provided for damping the catching impact.

Figure 2:
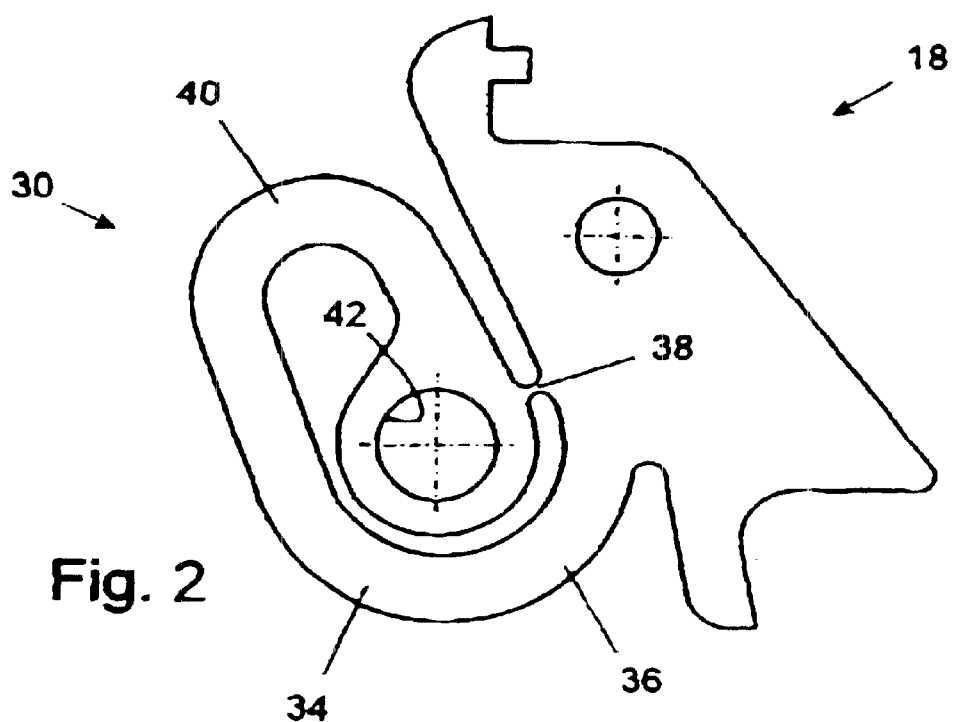
FIG. 2 a pawl of the carriage with rolled-up damping element from the side.

FIG. 2 shows only the pawl 18 of a carriage which otherwise corresponds to the carriage 10 of FIG. 1. To form the damping element 30, the flat steel bar 34 is rolled up clockwise in the diagram. The first bend 36 has a larger radius to the end and the second bend has the same direction as the first bend 36 so that the lug 42 comes to rest inside the first bend 36.

Figure 3:
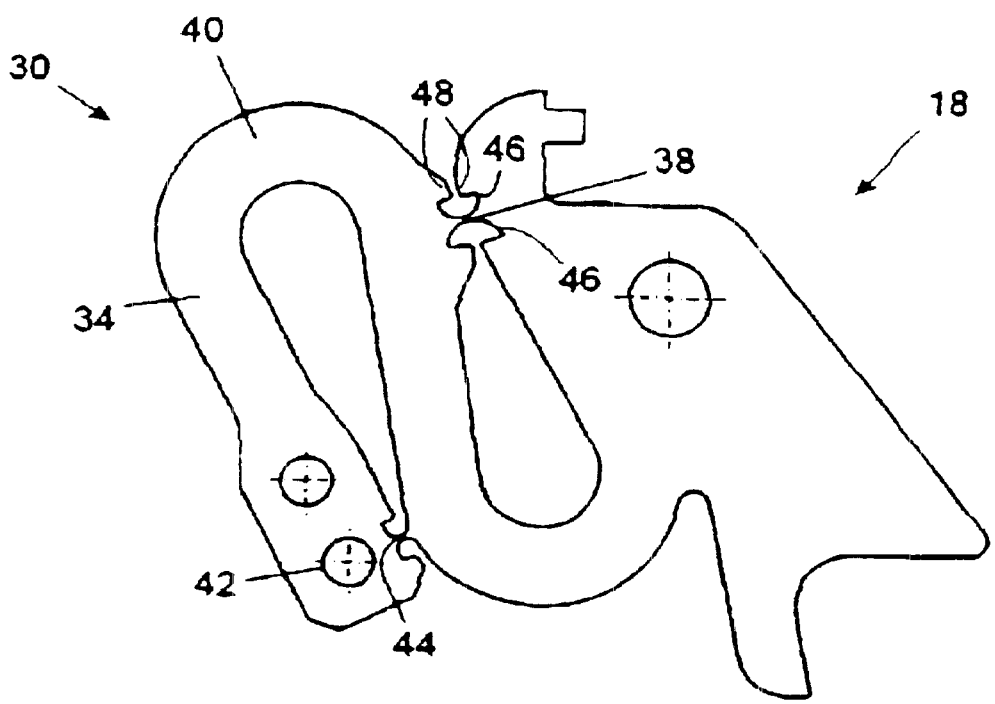
FIG. 3 a pawl where the area surrounding the link is developed so that the fracture points are integrated into the contour.

FIG. 3 likewise shows only the pawl 18 of a carriage which otherwise corresponds to that of FIG. 1. The form of the damping element 30 also corresponds to that of FIG. 1. However, the area surrounding the two links 38 and 44 is so developed that the fracture points of the links are integrated into the contour of the damping element 30. To this end, in front of and behind the links, recesses 46 are formed to which raised edges 48 join. As a result, the links 38, 44 have a defined length and can be precisely dimensioned although the flat steel bar 34 lies in the area surrounding the links 38, 44 directly against or at only quite a small distance from the upper end of the pawl 18 or the outside of the lug 42. Upon a fracture of the links 38, 44 the fracture elements therefore hardly protrude over the contour of the damping element 30 or flat steel bar 34, so that there is no danger of injury.

What is claimed is:

1. A damping element for a catching device for preventing a user from falling from a ladder or, a landing, the user being secured to the catching device by a catching belt which is secured to the catching device, the damping element damping the catching impact in the event of a fall, wherein the damping element comprises a first end adapted to be connected to a carriage of the catching device and a lug disposed at a second end adapted to be connected to the catching belt, the damping element being releasably fixed in a non-rectilinear shape by at least one frangible link dimensioned for releasing the damping element from its non-rectilinear shape when a certain load is applied, so that it can damp the catching impact, and wherein said damping element is bent upwards in an S-shape in a first bend of about 180° and then downwards in a second bend of about 180° and the two bends are each fixed by a frangible link.

2. The damping element according to claim 1, wherein the area immediately surrounding the at least one frangible link is recessed.

3. The damping element according to claim 1, wherein the at least one frangible link is dimensioned for releasing the damping element from its non-rectilinear shape at a force of about 3 to 5 kN.

4. A damping element for a catching device for preventing a user from falling from a ladder or, a landing, the user being secured to the catching device by a catching belt which is secured to the catching device, the damping element damping the catching impact in the event of a fall, wherein the damping element comprises a first end adapted to be connected to a carriage of the catching device and a lug disposed at a second end adapted to be connected to the catching belt, the damping element being releasably fixed in a non-rectilinear shape by at least one frangible link dimensioned for releasing the damping element from its non-rectilinear shape when a certain load is applied, so that it can damp the catching impact, and wherein said damping element is bent upwards in a first bend of about 90° and then downwards in a second bend of about 90°, with the same curve direction as the first bend, so that the lug is disposed within the first bend, the second bend being fixed to the lug by a frangible link.

5. The damping element according to claim 4, wherein the area immediately surrounding the at least one frangible recessed.

6. The damping element according to claim 4, wherein the at least one frangible link is dimensioned for releasing the damping element from its non-rectilinear shape at a force of about 3 to 5 kN.

7. A catching device for a climbing guard system for preventing a user from falling from a ladder or, a landing, the catching device adapted to be secured to a user by a catching belt, and comprising a damping element which damps the catching impact in the event of a fall wherein, the damping element comprises a first end adapted to be connected to one of a carriage or a pawl of the catching device and a lug disposed at a second end adapted to be connected to the catching belt, the damping element being releasably fixed in a non-rectilinear shape by at least one frangible link dimensioned for releasing the damping element from its non-rectilinear shape when a certain load is applied, so that it can damp the catching impact, the catching device further comprising a carriage adapted to guide the catching device along a guide rail and a pawl rotatably housed in the carriage and adapted to run against catching stops in the guide rail in the event of a fall wherein the damping element is attached to the pawl.

8. The catching device according to claim 7, further comprising a carriage adapted to guide the catching device along a guide rail, wherein the damping element is attached to the carriage.

* * * * *

UNITED STATES PATENT AND TRADEMARK OFFICE
CERTIFICATE OF CORRECTION

PATENT NO.    : 6,457,556 B1
DATED         : October 1, 2002
INVENTOR(S)   : Skade et al.

It is certified that error appears in the above-identified patent and that said Letters Patent is hereby corrected as shown below:

<u>Column 4,</u>
Lines 38-39, now reads "at least one frangible recessed." should read
-- at least one frangible link is recessed. --

Signed and Sealed this

Fourth Day of March, 2003

JAMES E. ROGAN
*Director of the United States Patent and Trademark Office*